United States Patent
Limanjaya (10) Patent No.: US 6,875,396 B1
(45) Date of Patent: Apr. 5, 2005

(54) HOT FILL CONTAINER

(75) Inventor: Tjandra Limanjaya, Jl. Kaji 1B-BA, Petojo Utara, Jakarta Pusat 10730 (ID)

(73) Assignee: Tjandra Limanjaya, Jakarta Pusat (ID)

( * ) Notice: Subject to any disclaimer, the term of this patent is extended or adjusted under 35 U.S.C. 154(b) by 0 days.

(21) Appl. No.: 10/204,807

(22) PCT Filed: Feb. 25, 2000

(86) PCT No.: PCT/IB00/00208
§ 371 (c)(1),
(2), (4) Date: Aug. 22, 2002

(87) PCT Pub. No.: WO01/62471
PCT Pub. Date: Aug. 30, 2001

(51) Int. Cl.$^7$ .................. B29C 49/12; B29C 49/64; B29C 49/66
(52) U.S. Cl. .................. 264/528; 264/532; 264/535; 264/904; 425/526; 425/529
(58) Field of Search .................. 264/528, 535, 264/532, 904; 425/526, 529

(56) References Cited

U.S. PATENT DOCUMENTS

| | | | | |
|---|---|---|---|---|
| 4,039,641 A | * | 8/1977 | Collins ..................... | 264/904 |
| 4,385,089 A | * | 5/1983 | Bonnebat et al. ......... | 264/904 |
| 4,512,948 A | * | 4/1985 | Jabarin ..................... | 264/904 |
| 4,839,127 A | * | 6/1989 | Ajmera et al. ............ | 264/904 |
| 4,871,507 A | * | 10/1989 | Ajmera ..................... | 264/528 |
| 4,883,631 A | * | 11/1989 | Ajmera ..................... | 264/904 |
| 4,934,918 A | * | 6/1990 | Outland ..................... | 249/79 |
| 5,730,914 A | * | 3/1998 | Ruppman, Sr. ............ | 264/904 |
| 5,989,008 A | * | 11/1999 | Wytkin ..................... | 249/79 |

FOREIGN PATENT DOCUMENTS

| | | |
|---|---|---|
| JP | 57212033 | 12/1982 |
| JP | 63280615 | 11/1988 |
| JP | 01310933 | 12/1989 |
| JP | 02127023 | 5/1990 |
| JP | 06297552 | 10/1994 |
| JP | 08174552 | 7/1996 |

* cited by examiner

*Primary Examiner*—Robert B. Davis
(74) *Attorney, Agent, or Firm*—Alfred A. Fressola; Ware, Fressola, Van Der Sluys & Adolphson LLP (57) ABSTRACT

A PET hot fill bottle (2) has a neck (3) and a body (4). It is stretched and blown into a cavity (14), with internal pressure holding the body against the cavity. During a first period, the cavity is heated to 100° to 160° C. for between 3 to 7 seconds to relax stresses in the body. During a second period the cavity is cooled to 60° to 120° C. for 4 to 8 seconds. This solidifies it—without introducing stresses—so that it can be removed from the mould. The resulting bottle is heat stable when filled with water close to its boiling point, namely at 92° C. to 98° C. For the rapid heating and cooling of the mould cavity, it is provided with two series of passages (16, 17). The former house ohmic heaters (18); whilst the latter are connected to water and air supply lines (19, 20).

11 Claims, 6 Drawing Sheets

FIG. 1

13 Neck cavity
14 insert neck blow mould
15 Stretch shaft
15A Air hole

51. Heating pot
52. Heater

FIG. 7

56. Cooling pin

FIG. 8

53. Neck cavity
65. Blow pin

FIG. 9

HOT FILL CONTAINER

The present invention relates to a plastics material container which can be filled with hot liquid.

It is advantageous to be able to fill a container, such as a bottle, with a drink, such as a fruit juice, when hot, because the heat of the liquid both renders it sterile itself and sterilises the bottle. However, there is the disadvantage that the heat may cause the stress held in the bottle to be relieved, with the result that the bottle distorts. For instance PET (Polyethylene Terephthalate) bottle are normally temperature stable up to only 60° C.

Techniques for sterilising bottles are as follows:
Carbonation of the liquid, which is applicable only to soft drinks and not to non-carbonated beverages,
γ radiation, which is expensive;
Addition of ozone, which is not possible for drinks including organic matter;
Addition of preservatives, but these tend to be toxic,
Hot-fill of glass bottles, typically at between 85°–92° C.

PP (Polypropylene) is heat resistant, but not generally suitable for foods, due to taste and lack of transparency. PET is a food grade material, being approved by the FDA. It has high transparency and no smell nor taste, but it is not heat reistant at least not in conventional bottle form.

Many attempts have been made to improve the temperature resistance of PET. Chief amongst these are:
Addition of PEN (Polyethylene Naphthalate) This polymer is expensive and difficult to process, with a small processing window. Further it has a short storage life.
Additional processing to relieve the stresses induced in the polymer by blowing of the bottle. Typically this involves blowing a bottle which is oversize, applying heat to cause it to shrink and then blowing it again to the final size. This is inefficient in requiring the use of TWO moulds and a quantity of polymer which is adequate for making the oversize bottle. Further, radiant heat is required in the shrink step.

The object of the present invention is to provide an improved hot-fill bottle and similar containers.

According to a first aspect of the invention there is provided a method of forming a body of plastics material container consisting in the steps of.
blowing a heated, injection moulded preform to finish formed shape in a mould imparting the finish formed shape to the body of the container,
holding the blown container body in contact with the mould at elevated temperature for a first period after blowing to allow internal blowing stresses to relax,
reducing the mould temperature and similarly holding the container body in contact with the mould at lower temperature for a second period to cool it below its solidification temperature without internal stressing of the container,
removing the container from the mould.

By "solidification temperature" is intended the temperature at or below which the container retains its finish formed shape in ambient temperature.

Desirably, elevated pressure, conveniently the blowing pressure, is maintained in the container during the first period.

Preferably, the inside of the container is cooled whilst it is held in contact with the mould during the second period. Conveniently this inside cooling is by means of cool pressure air circulated within the container body during the second period.

Preferably the container is of PET material.

Preferably the elevated temperature at which the mould—and the container in contact with the mould—is held is 130° C.±30°. Further, this step is preferably held for 5±2 second.

Preferably the reduced temperature to which the mould—and the container in contact with the mould—is cooled is 90° C.±30°. Further, this step is preferably held for 6±2 second.

Usually, the temperature of the mould will be dropped—from the elevated temperature to the reduced temperature—by between 40 & 50 Centigrade degrees.

In the preferred embodiment, the drop in temperature between the two periods is achieved by passing water through cooling passages in the mould. Thereafter, air is passed through cooling passages in the mould to maintain the mould temperature for the rest of the cooling period. During the mould cooling period, the interior of the container is cooled by circulation of cool air in the container, although this air is still maintained under pressure.

Preferably cooling air is passed through the container during the second, cooling period. At the end of the cycle, the mould is reheated, by ohmic heaters, to the elevated temperature.

According to a second aspect of the invention there is provided a plastics material container, the container being substantially free of internal, formation stresses whereby it is suitable for hot filling, the container having been formed by the method of the first aspect of the invention.

According to a third aspect of the invention there is a provided a mould tool for use in the method of formation and treatment of the body of a container of the second aspect of the invention, the mould tool having:
a blowing cavity;
a plurality of cooling passages for water and air circulation;
a plurality of heating passages in the mould tool for circulation of heating fluid and/or for ohmic heaters;
a blowing pin arrangeable before the blowing cavity is closed, in a neck of the container, for its blowing; and
a stretch pin extending through the blowing pin for stretching of the preform.

Preferably, the stretch pin has a plurality of small air circulation apertures for internal cooling of the container.

The cooling water passages are preferably adapted for circulation of air subsequent to the circulation of water during each moulding cycle.

The heating means may be configured as a plurality of heating passages.

Whilst it is envisaged that the heating passages may be adapted for circulation of a heating fluid such as oil, in the preferred embodiment they are adapted to house a plurality of ohmic heaters.

According to a fourth aspect of the invention there is provided a method of treating the inner neck of a plastics material container, the treatment consisting in the steps of:
assembling the neck of a preform of the container to an external support;
applying a heating pin to the inside of the neck for a first period;
applying a cooling pin to the inside of the neck for a second period;
removing the neck preform from the external support.

Normally, the heating and cooling of the inner neck will cause it to become heat stable by crystallisation of its inner neck material.

Where the preform is moulded in a production line common with the blowing of the container, the external support may comprise part of a mould cavity for the moulding of the neck of the preform. Alternatively the neck support will be complementarily shaped to the neck for tight support thereof. In the preferred embodiment, the support is radially split and itself externally supported by a neck plate.

To help understanding of the invention, a specific embodiment thereof will now be described by way of example and with reference to the accompanying drawings, in which.

Figure 1:
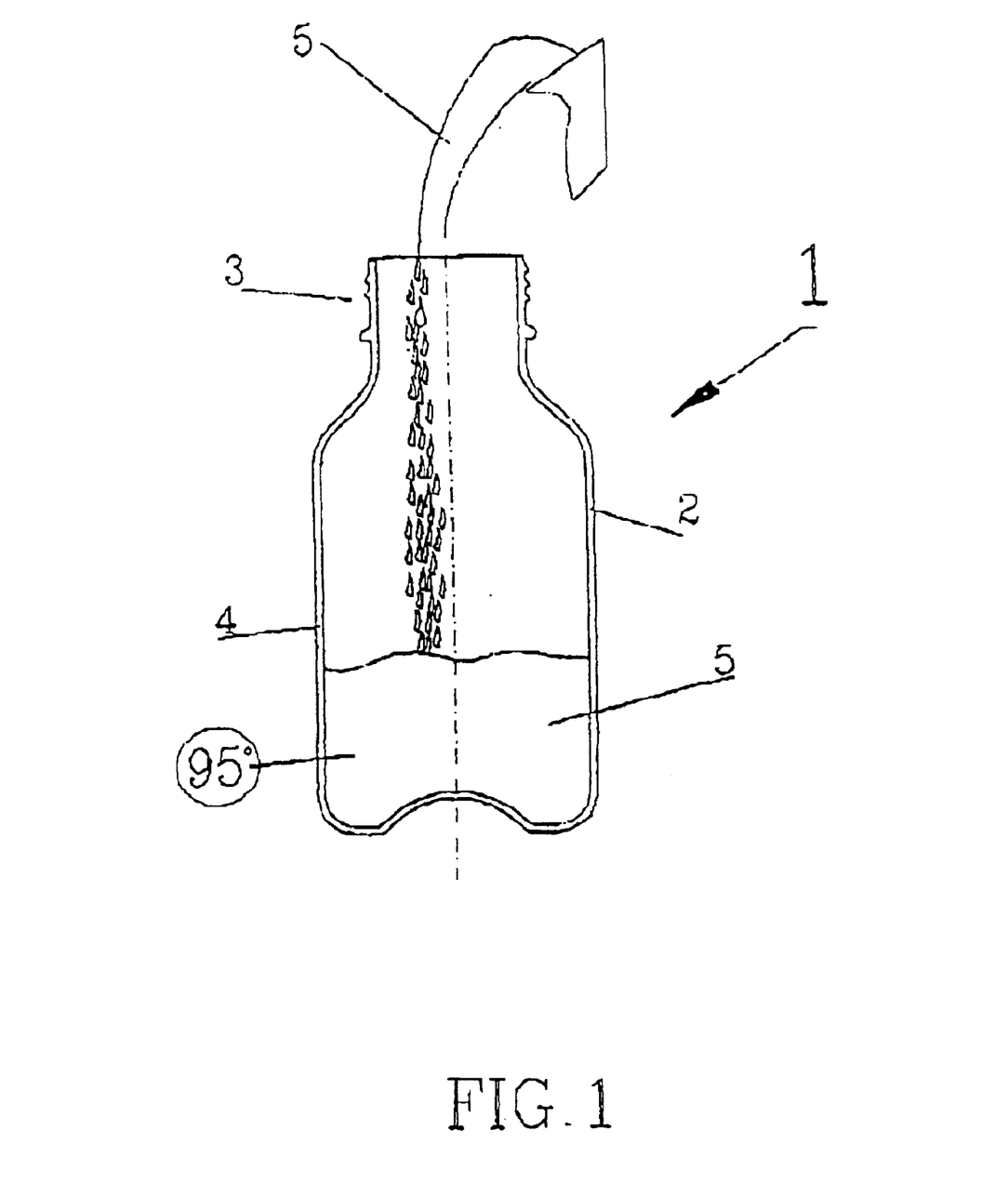
FIG. 1 is a side view of a hot fill bottle being filled with hot liquid.

Referring first to FIG. 1, there is shown a hot fill container 1 in the shape of a bottle 2 having a neck 3 and a body 4. FIG. 1 shows the bottle being filled with a hot water based liquid 5, close to boiling point. The liquid is sufficiently hot, typically 95° C. to substantially sterilise the inside of the bottle. If the bottle had been conventionally formed of PET material, at this temperature, any substantial stresses remaining in the bottle as a result of its stretching and blowing would be liable to cause it to contract to a smaller size. The extent and locality of the contraction is unpredictable. The invention is concerned with eliminating these stresses.

Figure 2:
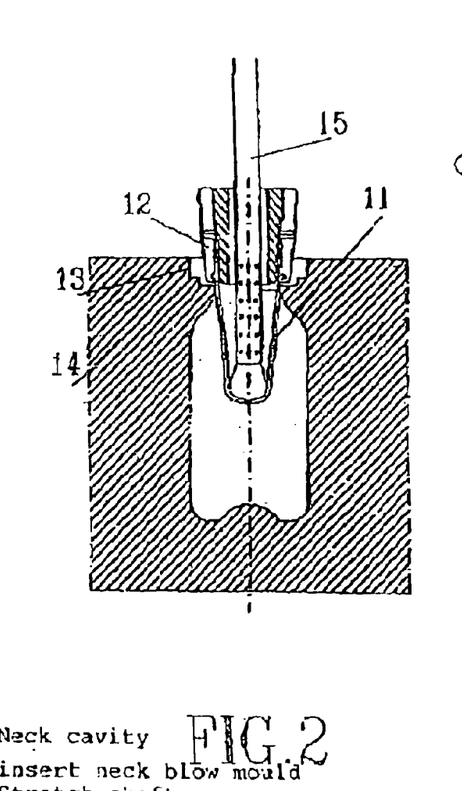
FIGS. 2, 3 and 4 are a series of side views of a hot fill bottle according to the invention being formed.
Figure 3:
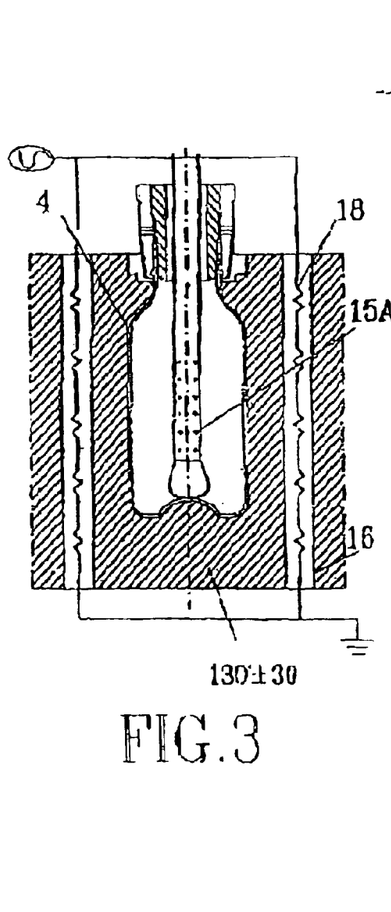

FIG. 2 shows a preform 11 in a neck support 12 assembled to the mouth 13 of a blow mould cavity 14 for providing a bottle of the invention with its finish formed shape. The preform is hot, typically around 160° C.—either having been injection moulded immediately prior to assembly to the blow mould cavity or having been reheated, see below—and the blow mould cavity is at approximately 130° C. ±30. By means of a stretch pin 15 provided with a series of small apertures and application of internal gas pressure, the preform is stretched and blown to its finish formed shape, see FIG. 3. Maintaining the pressure of the gas G in the bottle after blowing holds its body 5 in contact with the blow mould cavity and raises its temperature to that of the cavity. To speed the heating, the gas atmosphere 6 within the bottle can be circulated with hot air passed into the container around the stretch pin and out through it, the stretch pin being provided with a series of small apertures 15A. The body of the bottle is maintained at the elevated temperature for sufficient time to relax any stresses resulting from the stretching. A temperature range of between 100° C. and 160° C. and holding the body at this temperature for between 3 to 7 seconds is expected to be effective in stress relaxation.

Figure 4:
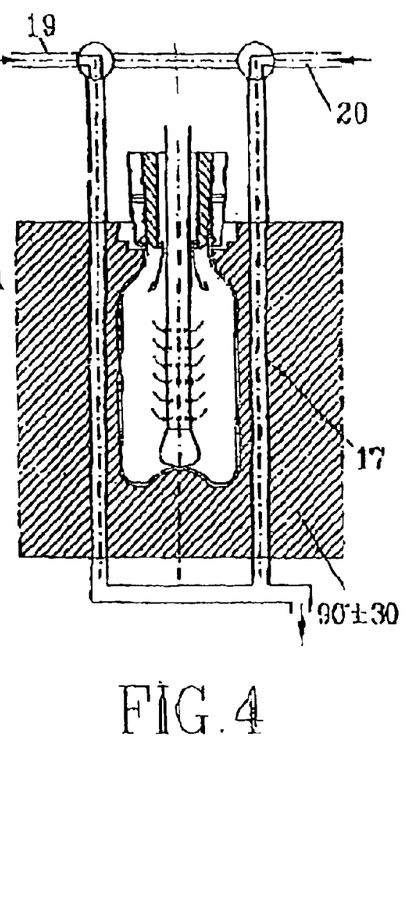

Opening of the mould to release the bottle at this temperature would result in it being too hot to maintain its finish formed shape. Accordingly, the mould is cooled to between 60° C. and 120° C. for 4 to 8 seconds, see FIG. 4. During this period cool air is circulated into the container and out through the small apertures in stretch pin, with pressure being maintained in the container. This solidifies it without introducing stresses—so that it can be removed from the mould. The resulting bottle is heat stable when filled with water close to its boiling point, namely at 92 to 98° C.

Figure 5:
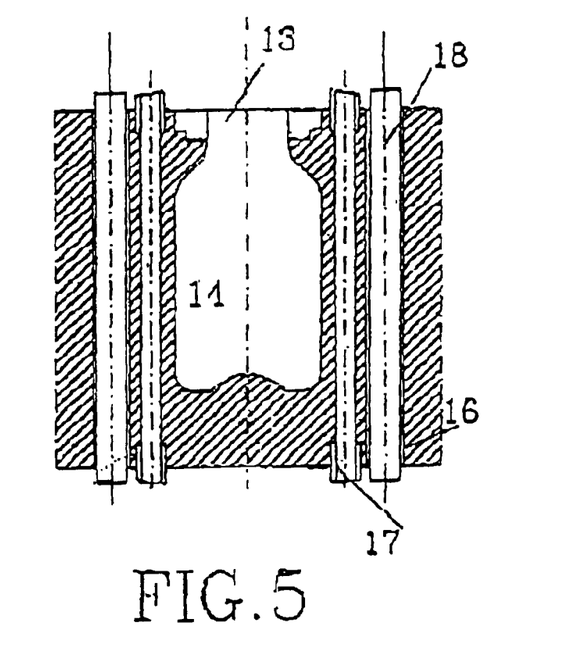
FIGS. 5 and 6 are more detailed cross-sectional side and plan views showing temperature control passageways in a mould for shaping the bottle.
Figure 6:
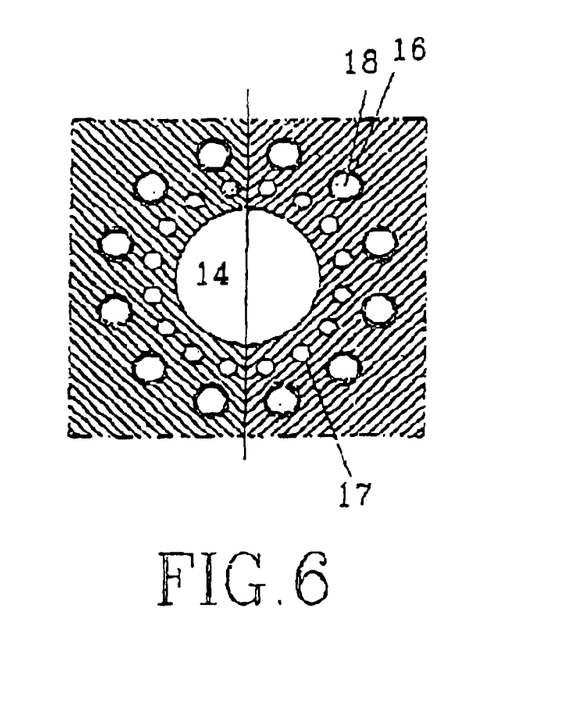

For the rapid heating and cooling of the mould, it is provided with two series of passages 16, 17. The former house ohmic heaters 18, whilst the latter are connected to water and air supply lines 19, 20.

After opening of the mould, the heaters 18 are switched on to rapidly heat it to the elevated temperature. A preform is assembled at its neck in the mouth of the mould, with the support 12 abutting a seat 21 in the re-closed mould. The preform is stretched and blown. The mould is thermostatically controlled to the elevated temperature, with the heaters being switched off at the end of the first period. By operation of ganged valves 22, cooling water is immediately passed through the cooling passages 17 to drop the temperature to its reduced level, to solidify fully the body of the container. In order to avoid dropping the temperature too much, in view of the need to reheat it again for the next cycle, the valves are operated during the cooling period to replace the water circulation by air circulation in the passages 17. At the same time, the cool air is circulated under pressure inside the bottle to cool the inside of the body.

Figure 7:
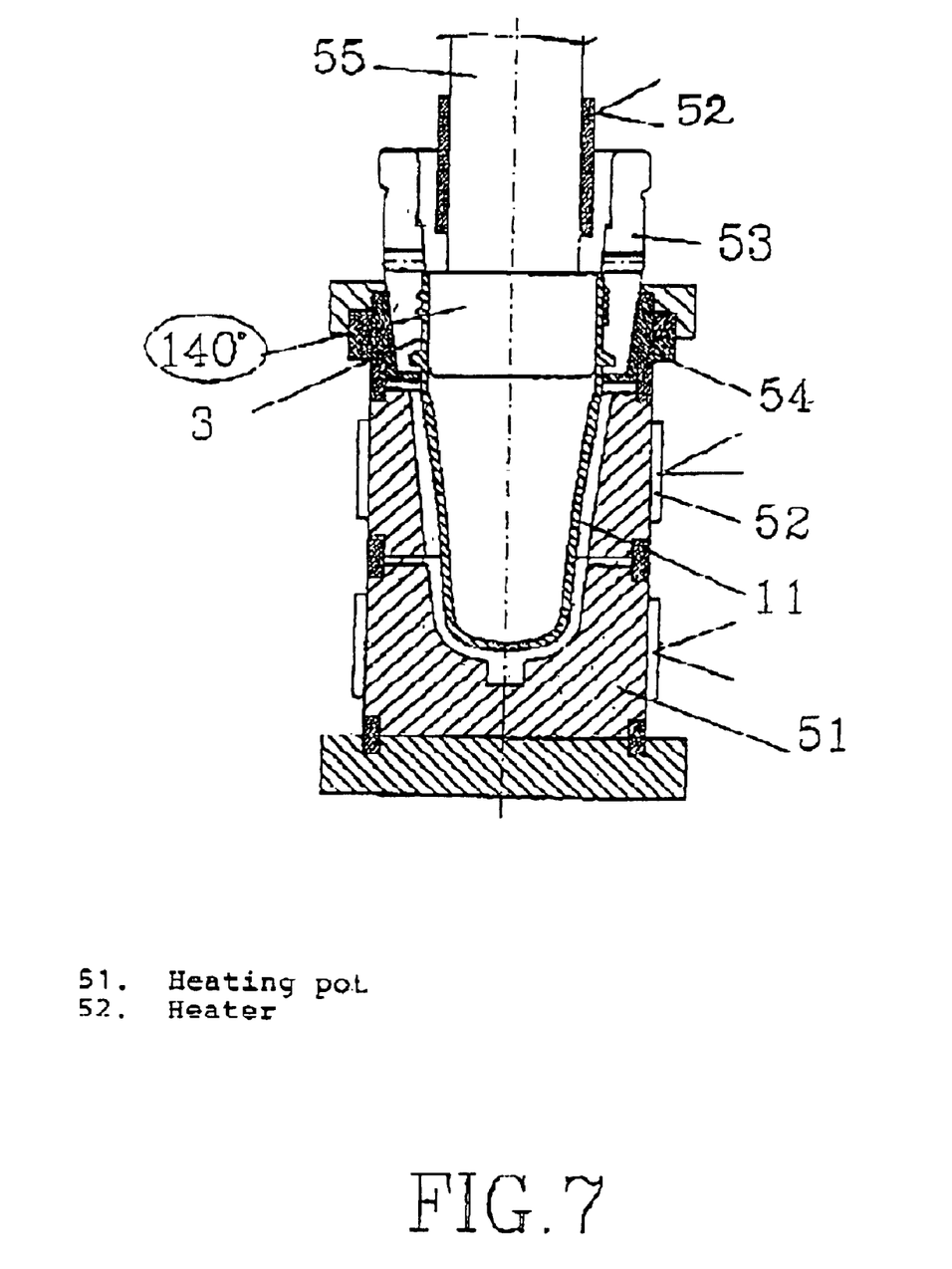
FIGS. 7 and 8 are cross-sectional side views of a heat treatment jig of the inside of a preform neck.
Figure 8:
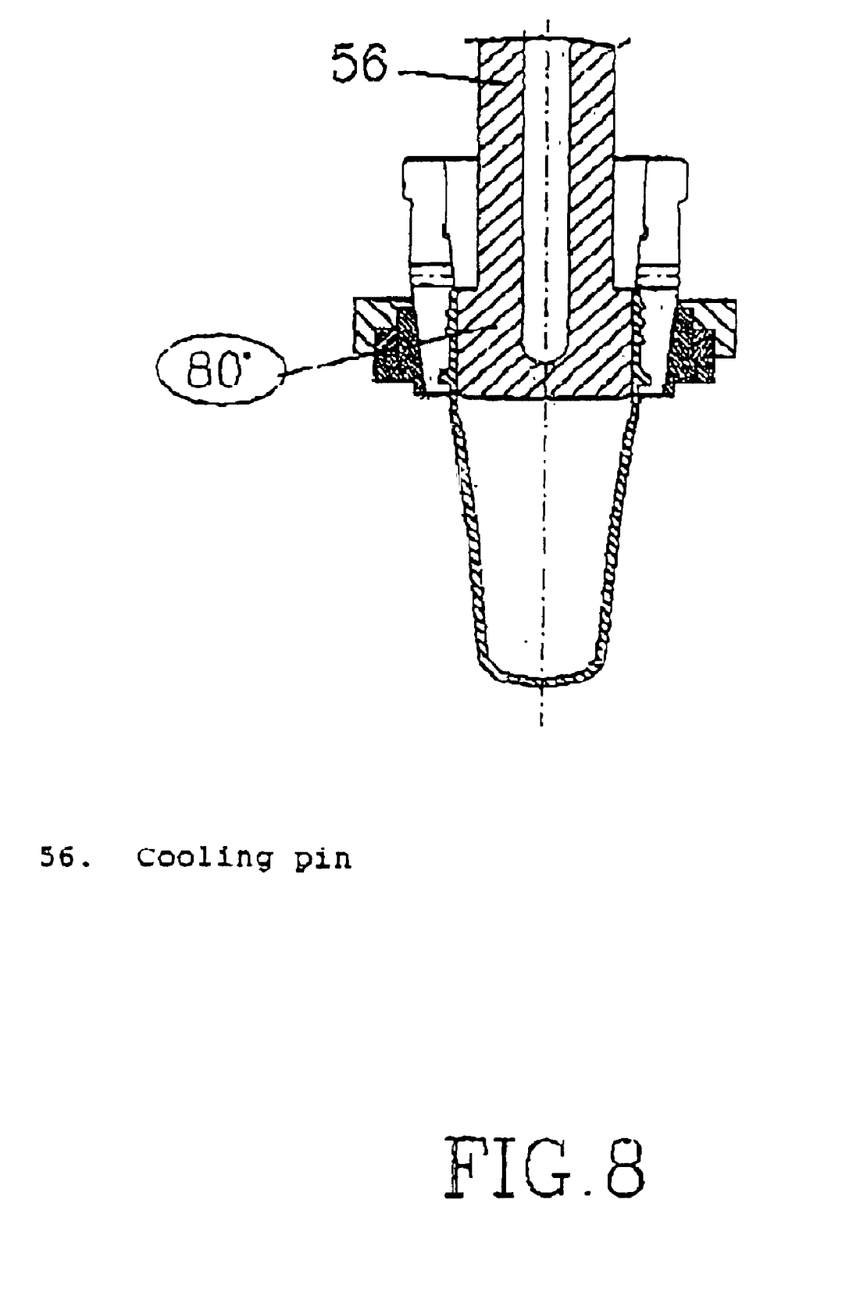

Turning now to FIGS. 7 & 8, the jig thereshown accommodates a preform 11 in a block 51 with heaters 52 for preheating the preform prior to its stretching and blowing. The neck of the preform is held in a radially parting support 53 located in an outer holding ring 54. For heat treatment of the inner neck in like manner to that of the body of the bottle, firstly a heating pin 55 is inserted into the neck to raise its temperature to the region of 120° to 160° C.—as shown in FIG. 7—to relax the internal stresses. After a first period, the heating pin is removed and replaced by a cooling pin 56 to cool the neck to the region of 60° to 100° C. as shown in FIG. 8.

Figure 9:
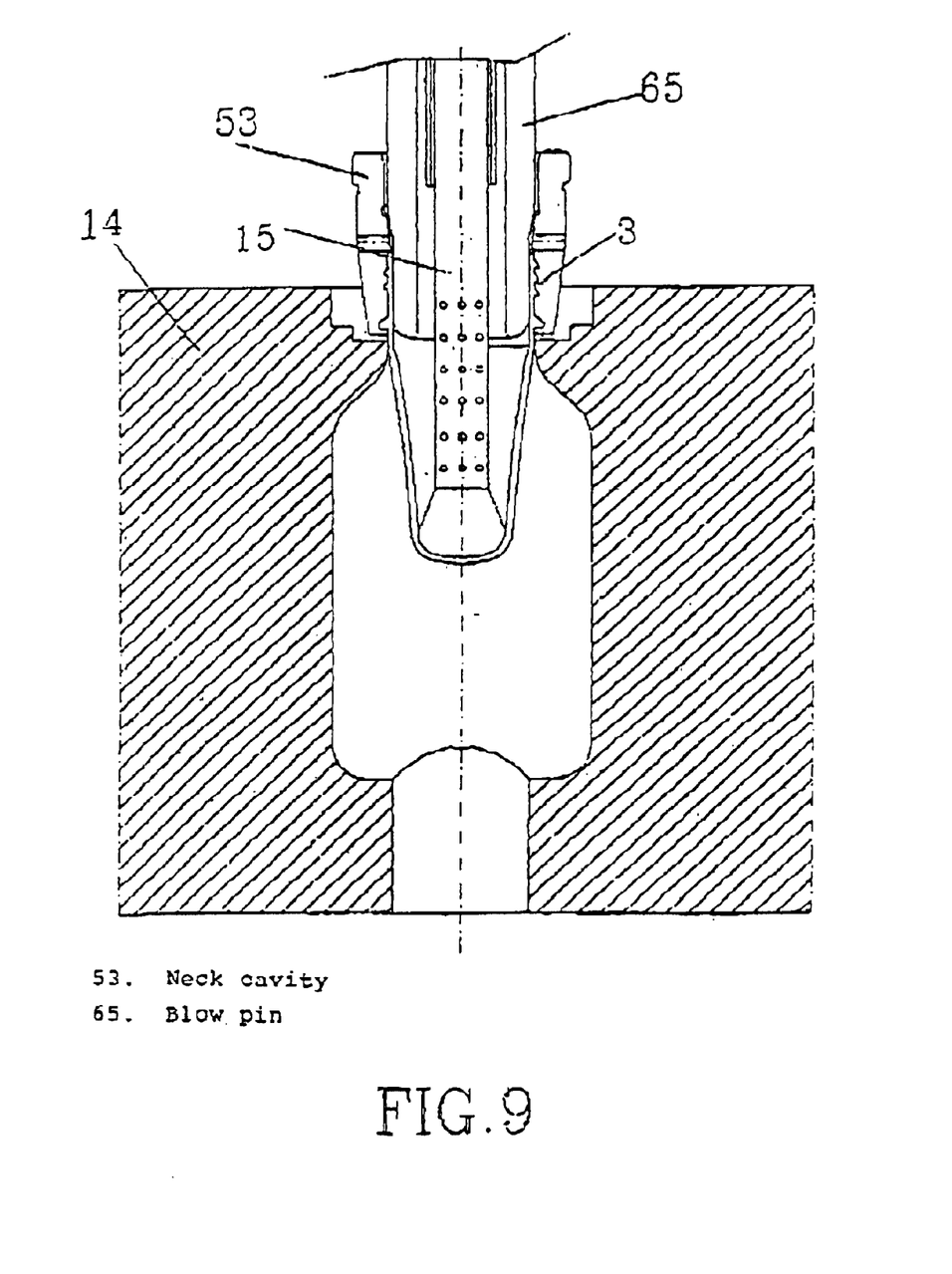
FIG. 9 is a view similar to FIG. 4 on a larger scale.

Once the cooling pin has been withdrawn, the new preheated preform is moved with the support 53 to the mould 14 for stretch-blowing and heat treatment. Once the support 53 is positioned at the mouth of the blow mould, a blowing pin 65 is advanced into the neck of bottle. The stretch pin 15 is then advanced through the blowing pin, as shown in FIG. 9, which shows essentially the same as FIG. 4 but in greater detail. The bottle is then formed as described above.

What is claimed is:

1. A method of forming a plastics material container comprising the steps of:

blowing a heated, injection moulded preform to finish formed shape in a mould imparting the finish formed shape to the body of the container, holding the blown container in contact with the mould at elevated temperature for a first period after blowing to allow internal blowing stresses to relax, passing water through the mould so as to reduce the mould temperature to a lower temperature, after passing the water through the mould, passing air through the mould so as to hold the mould at the lower temperature for a second period, holding the container in contact with the mould during said second period to cool the container below its solidification temperature without internal stressing of the container, and removing the container from the mould.

2. A method as claimed in claim 1, wherein elevated pressure is maintained in the container during the first period.

3. A method as claimed in claim 1, wherein elevated pressure is maintained in the container during the second period.

4. A method as claimed in claim 1, wherein the inside of the container is cooled while it is held in contact with the mould during the second period.

5. A method as claimed in claim 2, wherein the elevated pressure is the pressure at which the preform is blown.

6. A method as claimed in claim 1, wherein the material of the container is PET material and the elevated temperature at which the mould is held is 130° C.±30° C.

7. A method as claimed in claim 6, wherein the elevated temperature is held for a first period of 5±2 seconds.

8. A method as claimed in claim 1, wherein the material of the container is PET material and the reduced temperature to which the mould is cooled is 90° C.±30° C.

9. A method as claimed in claim 8, wherein the reduced temperature is held for a second period of 6±2 seconds.

10. A method as claimed in claim 1, wherein the temperature of the mould is dropped—from the elevated temperature to the reduced temperature—by between 40 & 50 Celsius degrees.

11. A method as claimed in claim 1, wherein the mould is reheated, by ohmic heaters, to the elevated temperature after the second, cooling period.

* * * * *

UNITED STATES PATENT AND TRADEMARK OFFICE
CERTIFICATE OF CORRECTION

PATENT NO.         : 6,875,396 B1
APPLICATION NO. : 10/204807
DATED                 : April 5, 2005
INVENTOR(S)        : Limanjaya It is certified that error appears in the above-identified patent and that said Letters Patent is hereby corrected as shown below:

Column 1, prior to line 3 please insert the following paragraph and headings:

--Cross Reference to Related Applications

This application is for entry into the U.S. national phase under §371 for International Application No. PCT/IB00/00208 having an international filing date of February 25, 2000, and from which priority is claimed under all applicable sections of Title 35 of the United States Code including, but not limited to, Sections 120, 363 and 365(c).

Technical Field--

Column 1, prior to line 5, please insert the following heading: --Background of the Invention--.

Column 1, line 15 after the word "beverages," please remove "," and insert --;-- therefor.

Column 1, line 19 after the word "toxic," please remove the "," and insert --;-- therefor.

Column 1, prior to line 40, please insert the folowing heading: --Summary of the Invention--.

Column 1, line 44 after the word "of" please remove "." and insert --:-- therefor.

Column 3, prior to line 6, please insert the following heading: --Description of the Drawings--.

Column 4, line 15 after the word "bottle" please remove "." and insert --;-- therefor.

Column 3, prior to line 19, please insert the following: --Best Mode for Carrying Out the Invention--.

UNITED STATES PATENT AND TRADEMARK OFFICE
CERTIFICATE OF CORRECTION

PATENT NO.       : 6,875,396 B1
APPLICATION NO. : 10/204807
DATED            : April 5, 2005
INVENTOR(S)      : Limanjaya It is certified that error appears in the above-identified patent and that said Letters Patent is hereby corrected as shown below:

Column 4, line 27, please delete the word "new" and insert --now--therefor.

Signed and Sealed this

Sixth Day of March, 2007

JON W. DUDAS
*Director of the United States Patent and Trademark Office*